United States Patent [19]
Runte

[11] 3,940,136
[45] Feb. 24, 1976

[54] AMUSEMENT DEVICE

[75] Inventor: Robert Ralph Runte, Buffalo Grove, Ill.

[73] Assignee: Fascination, Ltd., Des Plaines, Ill.

[22] Filed: July 17, 1974

[21] Appl. No.: 489,081

[52] U.S. Cl.............. 273/85 R; 74/10 R; 178/7.91; 194/1 A; 194/1 B; 194/1 F; 232/15; 273/136 A
[51] Int. Cl.² .......................................... A63F 3/00
[58] Field of Search .......... 273/136 R, 136 A, 85 R, 273/1 E; 178/7.9, 7.91; 232/12, 15, 16; 194/1 A, 1 B, 1 F; 74/10 R, 553

[56] References Cited
UNITED STATES PATENTS

| | | | |
|---|---|---|---|
| 432,610 | 7/1890 | Hagerty | 232/15 |
| 1,121,750 | 12/1914 | Miller | 74/10 X |
| 1,353,145 | 9/1920 | Clement | 74/553 X |
| 1,947,282 | 2/1934 | Theis | 74/553 |
| 2,596,259 | 5/1952 | Lewis, Sr. | 273/136 A |
| 2,660,904 | 12/1953 | Hilsinger, Jr. | 74/553 X |
| 2,856,122 | 10/1958 | Greenwald | 232/15 |
| 3,108,741 | 10/1963 | Thomas | 232/15 X |
| 3,503,608 | 3/1970 | Ylinen | 273/163 A X |
| 3,659,284 | 4/1972 | Rusch | 273/DIG. 28 |

OTHER PUBLICATIONS
Chicago Tribune, 1-4-1971 – Dick Tracy.
Radio Electronics, 4-1955.
Radio Electronics, 6-1951, p. 102.

*Primary Examiner*—Paul E. Shapiro
*Attorney, Agent, or Firm*—Anthony S. Zummer

[57] ABSTRACT

An amusement device, the subject matter herein, includes a support, which is particularly adapted for mounting on a floor. A hollow housing is secured to the support. The housing has a continuous bottom and side walls, and is open at its upper end. A table top is hingedly secured to the housing and is releasably locked thereto. The top has a screen opening in its center. A cathode ray tube is secured to the top, with the screen of the tube adjacent to the screen opening substantially parallel to the upper surface of the top. Electronic circuitry is mounted on the interior surface of the top and electrically connected to the cathode ray tube. A logic board is mounted in the housing and is connected to the electronic circuitry to generate the image of a ball moving across the screen and images of a plurality of paddles to give the appearance of a paddle striking the ball and returning it. A plurality of control knobs is mounted on the top for controlling the paddle images. A coin control device is mounted in the housing and is electrically connected to the electronic circuitry to turn on the amusement device.

6 Claims, 10 Drawing Figures

U.S. Patent  Feb. 24, 1976  Sheet 1 of 3  3,940,136
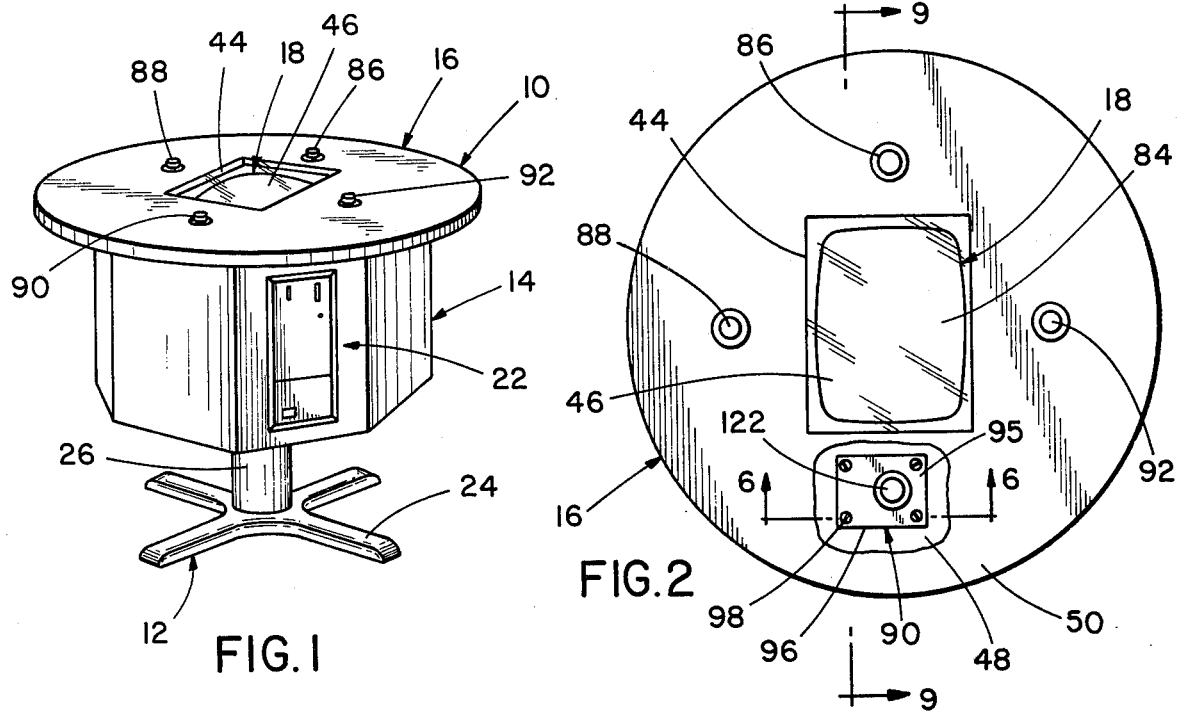
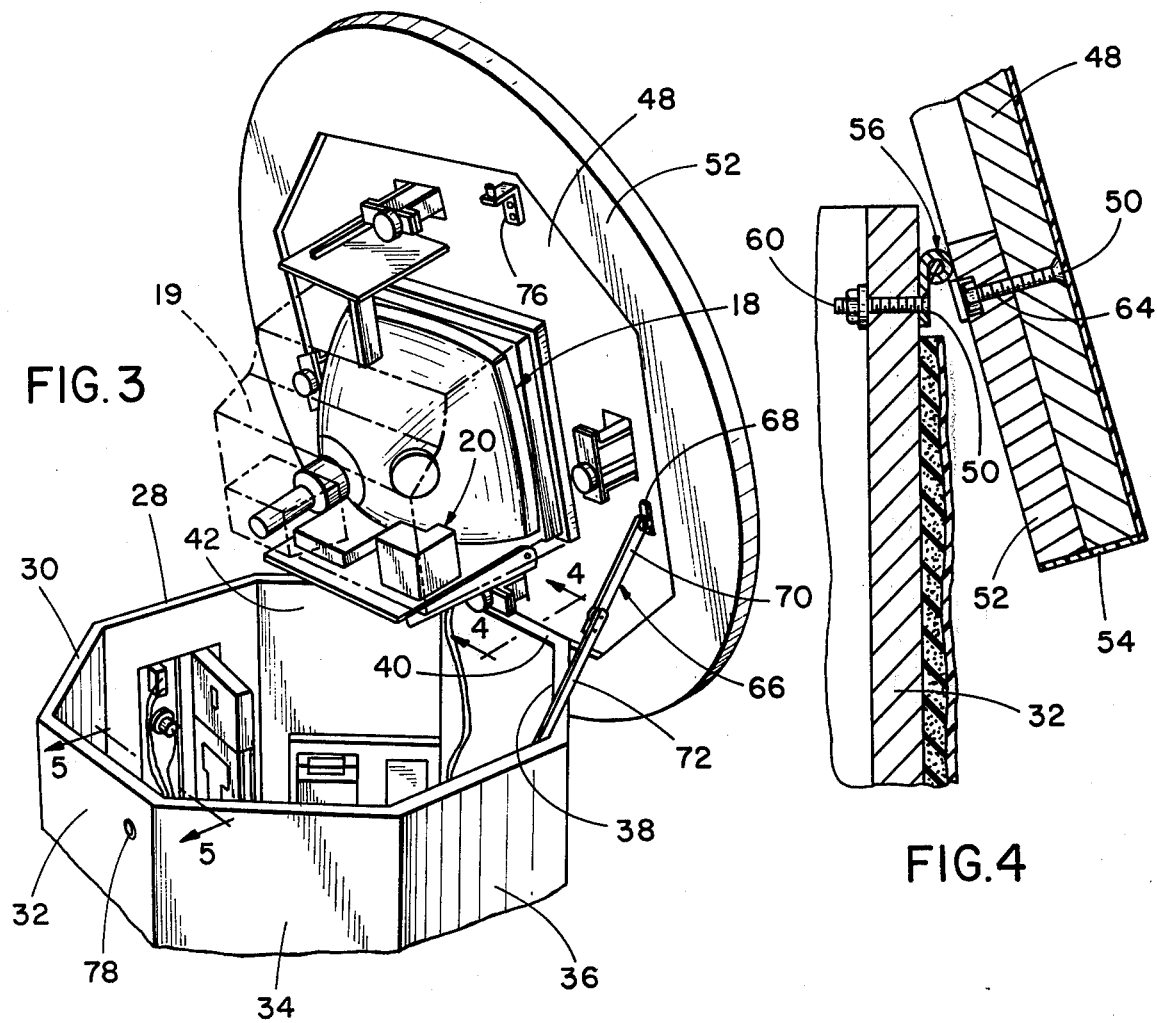

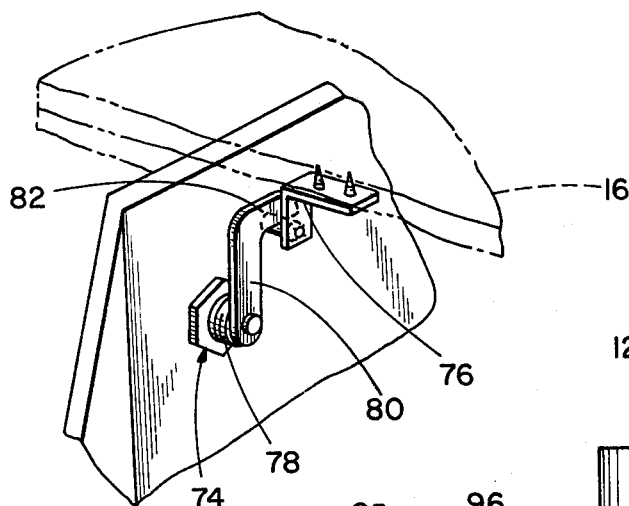
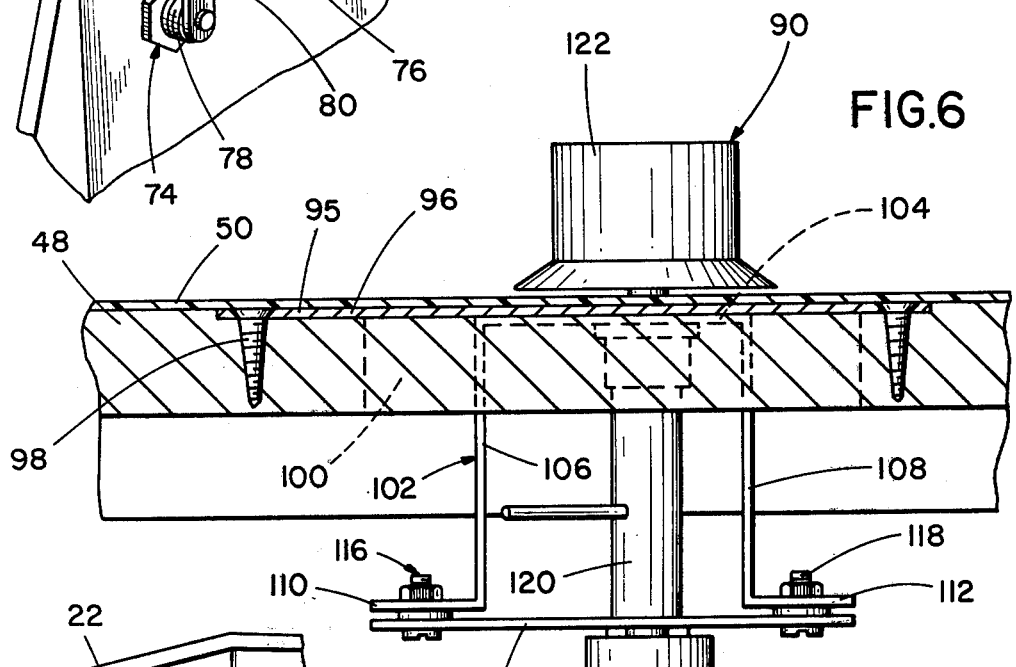
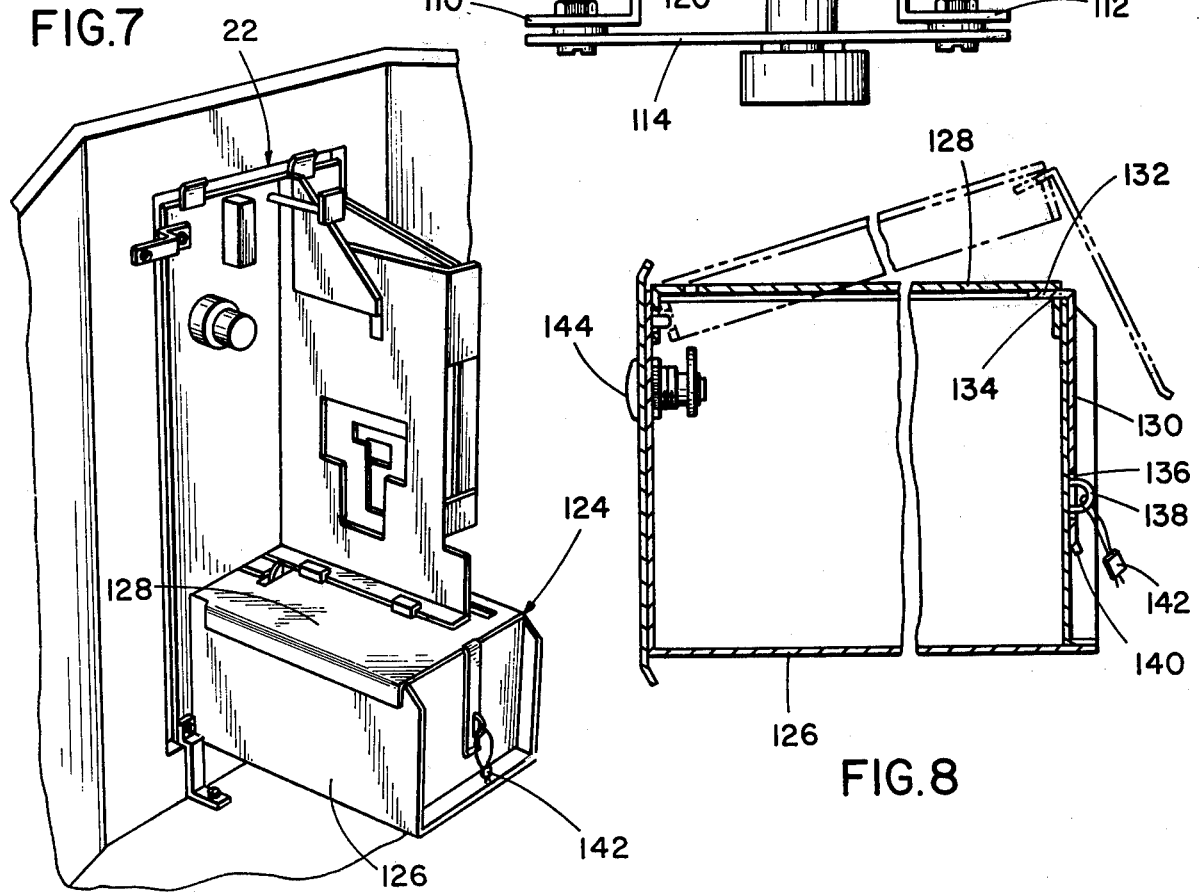

AMUSEMENT DEVICE

BACKGROUND OF THE INVENTION

Amusement devices of the type wherein a cathode ray tube is used to produce an image generated by a solid-state printed circuit board and the players control portions of the electronic circuitry by manipulating knobs to give the illusion of controlling some device are well-known. Most of these devices are generally mounted on a wall or are set up in a console. One particularly good market for a coin-controlled amusement device of this type is the cocktail lounge or bar market. The operators of such establishments usually wish to provide some source of amusement for patrons in order to keep the patrons in their establishments. By the same token, they do not wish to have the patrons engage solely in the play of amusement devices to inhibit them from consuming food and beverages dispensed at the establishments. One of the disadvantages of the console-type device is that the patrons leave their places and go to the console, which means that the service to the patrons is made more difficult and the patrons leave some of their personal belongings behind, which in some instances give rise to inadvertent exchange of property or outright misappropriation.

SUMMARY OF THE INVENTION

The present invention is directed to an amusement device of the type which utilizes a cathode ray tube and a screen of the tube. Players control a plurality of images shown on the screen by manipulation of control knobs. The present construction is one in which the cathode ray tube is placed in an attitude wherein the screen is substantially parallel to a table top; and the control knobs extend outward from the table top. The amusement device is built with the height at an appropriate height for a table in a cocktail lounge, so that the device thus forms a table. The players sit around a table and manipulate the device. Thus, the players do not leave their seats to go to a console; but, rather, are seated and make use of the amusement device.

The instant device includes a support, with a housing mounted on top of the support. A table top is hingedly connected to the housing; and a cathode ray tube is secured to the table top. Other electrical components are also mounted on the interior of the table top, so that, when the table top is pivoted, the electrical components are lifted out of the housing and exposed for easy repair, in the event that repair is necessary. A logic board is mounted in the housing and is connected to the electrical components. The amusement device is controlled by a coin-operated control device, which coin-operated control is mounted in the housing.

It is therefore a principal object of the present invention to provide an improved construction for an amusement device utilizing a cathode ray tube, wherein the device has a tube screen substantially parallel to a table top, which table top is at a convenient height for observing and manipulating control devices from a chair.

It is another object of the herein-disclosed invention to provide an improved construction for a table top amusement device, wherein electronic circuitry and cathode ray tube are fixed to the interior of the table top so that lifting of the table top exposes the various parts of the device.

It is a still further object of this invention to provide an amusement device which is highly secure in that there may be no tampering with the device.

Other objects and uses of the present invention will become readily apparent to those skilled in the art upon a perusal of the following specification in light of the accompanying drawings.

BRIEF DESCRIPTION OF THE DRAWINGS

FIG. 1 is a perspective view of a video amusement device which is a specific embodiment of the herein-disclosed invention;

FIG. 2 is an enlarged plan view of the video amusement device shown in FIG. 1, but with a portion broken away in order to show better the construction thereof;

FIG. 3 is an enlarged fragmentary perspective view of the amusement device shown in FIG. 1, but with its table top raised;

FIG. 4 is an enlarged fragmentary cross-sectional view taken on Line 4—4 of FIG. 3;

FIG. 5 is a side elevational view taken on Line 5—5 of FIG. 3, but with the table top moved down into a closed position, which table top is shown in dotted form;

FIG. 6 is an enlarged cross-sectional view taken on Line 6—6 of FIG. 2;

FIG. 7 is an enlarged fragmentary perspective view of a coin control device of the amusement device;

FIG. 8 is a cross-sectional view of a portion of the control device of FIG. 7;

DESCRIPTION OF THE PREFERRED EMBODIMENT

Figure 9:
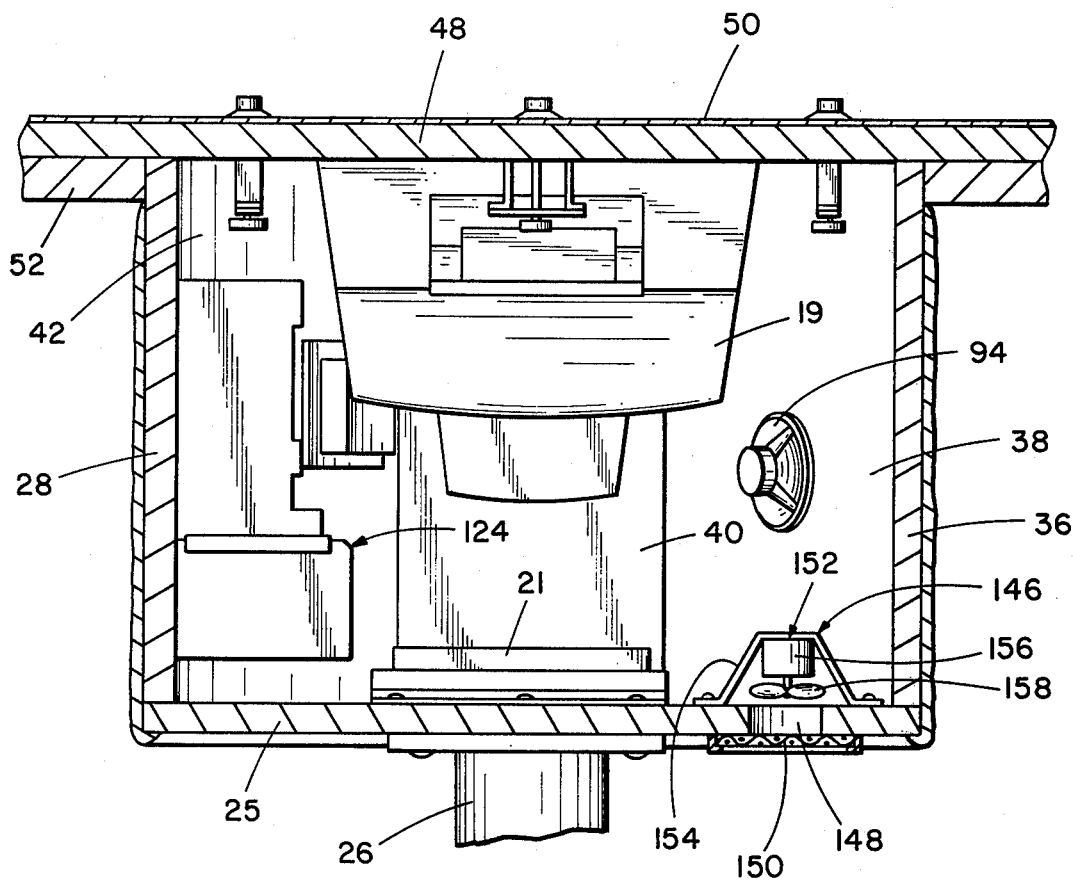
FIG. 9 is a cross-sectional elevational view of the device shown in FIG. 1.
Figure 10:
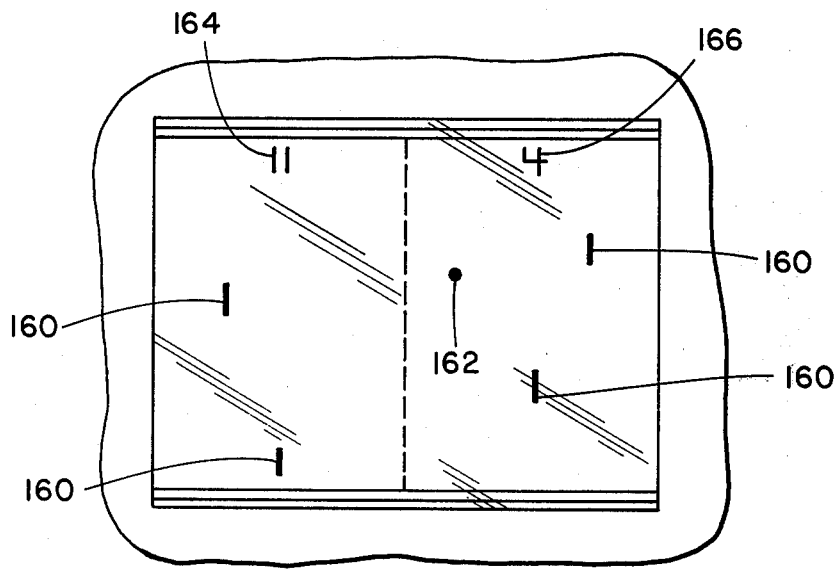
FIG. 10 is an enlarged plan view, showing images produced on a screen of a cathode ray tube.

Referring now to the drawings, and especially to FIG. 1, a coin-operated video amusement device, which is a specific embodiment of the present invention, is generally indicated by numeral 10. Amusement device 10 generally consists of a support 12, a housing 14 mounted on the support 12, a table top 16 hingedly mounted on the housing 14, a conventional cathode ray tube 18 mounted on the interior of table top 16, with a conventional shield 19 (shown in dotted form) covering the tube, electronic circuitry 20 mounted on the interior of table top 16, a solid-state printed circuit logic board 21 mounted in housing 14 and electrically connected to the electronic circuitry, and a coin control device 22 mounted in the housing 14 and electrically connected to the electronic circuitry 20.

The support 12 is of conventional construction in that it consists of four identical feet 24 formed integral with each other, joined at a central junction to form a base. An upright column 26 is connected to the base at its lower end.

The housing 14 includes a floor 25, fixed to the upper end of column 26. The housing includes eight side walls 28, 30, 32, 34, 36, 38, 40 and 42. The side walls have their adjacent edges sealingly fixed to each other and to the floor to form an open-ended housing.

The table top 16 has its upper surface flat, and has a rectangular screen aperture 44 in its center. A transparent bronze-tinted one-quarter inch thick plate glass 46 is mounted in the screen aperture 44, with its upper surface on the same plane as the upper surface of the table top to form a continuous smooth surface. The glass 46 has its edges sealed to the top to prevent any foreign matter from passing through aperture 44.

Table top 16 has a flat base 48, with a decorative sheet 50 over the base material. Along the periphery of the underside of the top, there is an underlayer 52, which conforms to the outline of the housing for receiving the housing within the underlayer. A decorative edge 54 covers the edges of the base 48 and the underlayer 52.

The table top 16 is pivotedly connected to the housing 14 by a piano hinge 56. The piano hinge is conventional in its construction in that one half 58 is secured to wall 40 by fasteners 60; and the other half 62 is secured to the top 16 by fasteners 64. A bracket 66 also connects the table top 16 with the housing. The bracket 66 includes a pivot 68 fixed to the interior of base 48. A first bracket arm 70 is pivotedly connected to pivot bracket 66. A second bracket arm 72 is pivotedly connected to arm 70 and to wall 36. Bracket 66 limits the movement of table top 16 relative to the housing.

A lock 74 releasably locks the table top to wall 32 of the housing. The lock includes a catch 75, which is secured to the interior surface of the base 48. The catch 75 includes a catch mount 76 and a catch rod 77 extending outward from the mount toward wall 32 of the housing. The lock also includes a lock cylinder 78, which is mounted in wall 32. The lock cylinder is connected to a cam 80, which pivots about the lock cylinder. The cam 80 has an arm 82, which is positionable in engagement with rod 77 of catch 75 to lock the table top in a down position or in connection with the side wall 32.

The cathode ray tube 18 has a conventional screen 84, which is positioned adjacent to glass 46 in aperture 44. The screen is parallel to the table top 16. As was mentioned above, the tube 18 is connected to electronic circuitry 20, the construction of which circuitry is well-known in the art and is commercially available, as is the tube. Appropriate sections of the electronic circuitry are controlled by manual control devices. There are four manual control devices 86, 88, 90 and 92. The electronic circuitry is connected to the logic board 21, which is mounted on a pair of rails 93 on the floor of the housing. A conventional speaker 94 is mounted inside the housing and is electrically connected to the logic board to produce an appropriate sound.

The mechanical construction of each of the manual control devices is identical to each other manual control device. The construction of one of the devices is described in detail below. Manual control device 90 is best shown in FIGS. 2 and 6. As may be seen in FIG. 6, control device 90 includes a rectangular mounting plate 95, which is held in a recess 96 in base 48 by four wood screws 98. The upper surface of the mounting plate is flush with base 48. The base 48 has a rectangular shaft aperture 100 communicating with recess 96 and opening into the interior of the housing. A U-shaped mounting bracket 102 is secured to the mounting plate 95. The mounting bracket includes a base arm 104 fixed to mounting plate 95. A pair of upstanding arms 106 and 108 is formed integral with opposite ends of the base arm 104. Ears 110 and 112 are formed integral with arms 106 and 108, respectively, and extend outwardly from their respective arms. A potentiometer bracket 114 is secured to the ears 110 and 112 by fasteners 116 and 118, respectively. A knob shaft 120 is connected to a potentiometer 121, which is mounted on the bracket 114. The knob is rotatably mounted in plate 95 and extends up through decorative sheet 50. A knob 122 is mounted on the shaft 120 to provide a convenient means for rotating the shaft. The shaft is connected to the potentiometer, which forms a portion of the electronic circuitry, as is well-known in the art. The decorative sheet 50 lies over mounting plate 95 to provide a continuous surface over the mounting plate and adjacent thereto.

The coin control device is conventional in its construction for receipt of coins and operation of a control to the electronic circuit to energize the circuit. The coin control device includes a coin bank 124. Coin bank 124 includes an open-top receptacle 126, which has a receptacle cover 128 hingedly connected to one edge thereof. The receptacle cover 128 has an arm 130 pivotally connected thereto. The arm 130 includes an ear 132, which extends into a slot 134 in cover 128. The arm has a hasp slot 136 cut therein, which removably receives a hasp 138. The hasp 138 is fixed to a wall of receptacle 126. The arm has a lip 140 on the end spaced away from the ear 132. A seal 142 is positioned through the hasp 138 when the arm is in position to lock the cover 128 onto the container 126. The coin bank 126 may be removed from the remainder of the elements in the coin control device 22 by release of a lock 144.

The interior of the housing is cooled by a draft assembly 146. Floor 25 contains a draft aperture 148, with a screen 150 mounted thereover. A fan 152 is mounted on the floor adjacent to the draft aperture. The fan includes a fan mounting bracket 154, with a fan motor 156 mounted thereon. A conventional fan blade 158 is connected to the motor to drive air through the draft aperture.

The operation of the amusement device is simple in that two or more players insert sufficient coins into the coin control device 22 to activate the electronic circuitry. The players manipulate selected knobs 86, 88, 90 and 92 in a game similar to ping pong. By appropriately moving the knobs, the players move representative paddle images 160 across the screen so that a dot 162 (which represents a ball) on the screen goes back and forth between the paddle images. As the dot appears to strike a paddle, a sound is produced from speaker 94 for greater realism. Should a player fail to place a paddle image in position to have the ball appear to strike the paddle image and return the ball to his opponent, the ball goes by and goes off the screen, thereby scoring a point for the opposing player. The score is displayed on the screen by numerals, such as numerals 164 and 166.

The construction of the amusement device is such that the players may place glasses and dishes on the upper surface of the top 16; and there is a continuous surface. The glass 46 is sealed around its edges so that any spillage of any liquids does not go under the glass and into the electronic circuitry or onto the screen. The knob shaft for each of the manual control devices is also sealed at its respective mounting plate so that no liquid may enter. It may be appreciated that the construction of the amusement device is such that it is virtually impossible to get into the interior of the housing. Underlayer 52 surrounds the upper edge of the housing so that it is extremely difficult to insert any materials into the housing.

The construction of the device is such that the support is beneath the housing 14; and the table top 16 extends out beyond the housing 14, so that players may be comfortably seated around the amusement device. This comfortable seating of the players provides an added inducement for the players to utilize the amusement device while they eat and drink.

Maintenance of the amusement device is greatly facilitated by the construction herein. As was mentioned above, the tube 18 and the associated electronic circuitry 20 is mounted on the underside of table top 16. When it is necessary to perform any maintenance, the lock 74 is released so that top 16 may pivot about hinge 56. Pivoting of the top is limited by bracket 66. When the table top is pivoted to the attitude shown in FIG. 3, all of the parts are presented for ready servicing. It is not necessary for the service personnel to engage in a disassembly of a large number of parts in order to get at a given part; but, rather, the parts are presented for servicing.

The coin control device 22, with its coin bank 124, is readily available when the top is open. However, the serviceman may only open the cover 128 if he breaks the seal 142. Thus, there is an indication of entry into the container. It may be appreciated that the seal 142 may be replaced with a suitable lock if it is so desired.

Although a specific embodiment of the present invention has been described in detail and shown in the accompanying drawings, it is readily apparent that those skilled in the art may make various modifications and changes in the construction of the disclosed device without departing from the spirit and scope of the present invention. It is to be expressly understood that the instant invention is limited only by the appended claims.

What is claimed is:

1. An amusement device comprising, an upright support adapted for mounting on a floor, a housing secured to and supported by the upper portion of the support at a selected height above the floor, said housing being open at its uppermost position, a table top hingedly connected to the housing to allow the top to be raised for exposing the interior of the housing, said top having a screen aperture in its center, a cathode ray tube secured to the top and having a screen positioned adjacent to the screen aperture to allow the screen to be viewed exteriorly of the top, electronic circuitry mounted on the interior surface of the top and electrically connected to the cathode ray tube to reproduce an image of a ball moving across the screen and a plurality of paddle images for giving the appearance of a paddle striking the ball and returning it, a plurality of manual control devices mounted on the top and accessible from the exterior of the top to manipulate selected portions of the electronic circuitry to move the paddle images on the screen, a coin control device mounted on the housing and electrically connected to the electronic circuitry to control the operation of electronic circuitry for the production of the images on the screen, a lock for releasably locking the top to the housing to control access to the interior of the housing, each of the manual control devices including a mounting plate positioned in the table top, each mounting plate covered by a portion of the top, a shaft aperture positioned below a portion of the mounting plate, a U-shaped bracket secured to the mounting plate and a portion of the electronic circuitry supported on the U-shaped bracket, a knob shaft rotatably mounted in the mounting plate and the U-shaped bracket and extending above the table top, said knob shaft connected to the portion of the electronic circuitry on the U-shaped bracket for controlling selected portions of the circuitry, and a knob mounted on the shaft exteriorly of the table top for operating the shaft, whereby a player turns the knob to move selectively an image across the screen.

2. An amusement device comprising, an upright support adapted for mounting on a floor, a housing secured to and supported by the upper portion of the support at a selected height above the floor, said housing being open at its uppermost position, a table top hingedly connected to the housing to allow the top to be raised for exposing the interior of the housing, said top having a screen aperture in its center, a cathode ray tube secured to the top and having a screen positioned adjacent to the screen aperture to allow the screen to be viewed exteriorly of the top, electronic circuitry mounted on the interior surface of the top and electrically connected to the cathode ray tube to reproduce an image of a ball moving across the screen and a plurality of paddle images for giving the appearance of a paddle striking the ball and returning it, a plurality of manual control devices mounted on the top and accessible from the exterior of the top to manipulate selected portions of the electronic circuitry to move the paddle images on the screen, a coin control device mounted on the housing and electrically connected to the electronic circuitry to control the operation of electronic circuitry for the production of the images on the screen, a lock for releasably locking the top to the housing to control access to the interior of the housing, said table top includes a recess adjacent to each of the manual control devices, each of said control devices including a mounting plate mounted in its respective recess, each manual control device having a shaft extending through the mounting plate and being connected to a portion of the electronic circuitry, and said top having a decorative sheet extending over the surface of the top and over the mounting plates to provide a continuous surface.

3. An amusement device comprising, an upright support adapted for mounting on a floor, a housing secured to and supported by the upper portion of the support at a selected height above the floor, said housing being open at its uppermost position, a table top hingedly connected to the housing to allow the top to be raised for exposing the interior of the housing, said top having a screen aperture in its center, a cathode ray tube secured to the top and having a screen positioned adjacent to the screen aperture to allow the screen to be viewed exteriorly of the top, electronic circuitry mounted on the interior surface of the top and electrically connected to the cathode ray tube to reproduce an image of a ball moving across the screen and a plurality of paddle images for giving the appearance of a paddle striking the ball and returning it, a plurality of manual control devices mounted on the top and accessible from the exterior of the top to manipulate selected portions of the electronic circuitry to move the paddle images on the screen, a coin control device mounted on the housing and electrically connected to the electronic circuitry to control the operation of electronic circuitry for the production of the images on the screen, a lock for releasably locking the top to the housing to control access to the interior of the housing, said table top includes a mounting plate recess adjacent to each of the manual control devices, each of said control devices including a mounting plate mounted in its respective recess substantially parallel to the surface of the table top, each manual control device having a knob shaft extending through its respective mounting plate and being connected to a selected portion of the electronic circuitry, a transparent glass positioned in the screen aperture in the center of the top, and said table top having a decorative sheet extending over the mounting plates and over the entire surface of the top to the glass and being on substantially the same plane as the glass to form a substantially continuous surface on the table top, said glass being sealingly secured at its edges to the top to seal closed the screen aperture, whereby the screen is visible exteriorly of the top but is protected from mechanical damage either by impact or by foreign materials by said glass.

4. An amusement device comprising, an upright support adapted for mounting on a floor, a housing secured to and supported by the upper portion of the support at a selected height above the floor, said housing being open at its uppermost position, a table top hingedly connected to the housing to allow the top to be raised for exposing the interior of the housing, said top having a screen aperture in its center, a cathode ray tube secured to the top and having a screen positioned adjacent to the screen aperture to allow the screen to be viewed exteriorly of the top, electronic circuitry mounted on the interior surface of the top and electrically connected to the cathode ray tube to reproduce an image of a ball moving across the screen and a plurality of paddle images for giving the appearance of a paddle striking the ball and returning it, a plurality of manual control devices mounted on the top and accessible from the exterior of the top to manipulate selected portions of the electronic circuitry to move the paddle images on the screen, a coin control device mounted on the housing and electrically connected to the electronic circuitry to control the operation of electronic circuitry for the production of the images on the screen, a lock for releasably locking the top to the housing to control access to the interior of the housing, the support includes a plurality of outwardly-extending feet formed integral with each other at a junction and an upright column secured to the junction of said feet, said housing secured to the upper end of the column, said table top extending outwardly of the housing to allow players to place their feet and knees below the table top, each of the manual control devices includes a mounting plate positioned in the top, each mounting plate covered by a portion of the top, a shaft aperture extending through a portion of the top positioned below a portion of its respective mounting plate, a U-shaped bracket positioned in its respective shaft aperture and secured to its respective mounting plate, a portion of the electronic circuitry supported on the U-shaped bracket, a knob shaft rotatably mounted in its respective mounting plate and its respective U-shaped bracket, each of said knob shafts connected to its respective portion of the electronic circuitry for controlling selected portions of the circuitry, and a knob mounted on each shaft exteriorly of the table, whereby a player turns a selected knob to move a selected image on the screen.

5. An amusement device comprising, an upright support adapted for mounting on a floor, a housing secured to and supported by the upper portion of the support at a selected height above the floor, said housing being open at its uppermost position, a table top hingedly connected to the housing to allow the top to be raised for exposing the interior of the housing, said top having a screen aperture in its center, a cathode ray tube secured to the top and having a screen positioned adjacent to the screen aperture to allow the screen to be viewed exteriorly of the top, electronic circuitry mounted on the interior surface of the top and electrically connected to the cathode ray tube to reproduce an image of a ball moving across the screen and a plurality of paddle images for giving the appearance of a paddle striking the ball and returning it, a plurality of manual control devices mounted on the top and accessible from the exterior of the top to manipulate selected portions of the electronic circuitry to move the paddle images on the screen, a coin control device mounted on the housing and electrically connected to the electronic circuitry to control the operation of electronic circuitry for the production of the images on the screen, a lock for releasably locking the top to the housing to control access to the interior of the housing, the support includes a plurality of outwardly-extending feet formed integral with each other at a junction and an upright column secured to the junction of said feet, the housing secured to the upper end of the column, said table top having a portion extending outwardly of the housing to allow players to place their feet and knees below the table top when seated, said table top includes a mounting plate recess adjacent to each of the manual control devices, each of said control devices including a mounting plate positioned in its respective recess and secured to the top, each manual control device having a shaft extending through the mounting plate and being connected to a selected portion of the electronic circuitry for controlling selected portions of the circuitry, a transparent member positioned in the screen aperture in the center of the top, said table top including a decorative sheet extending over the mounting plates over the entire upper surface of the top and abutting the transparent member to form a substantially continuous flat surface therewith, said transparent member being sealingly secured at its edges to the top to seal closed the screen aperture, whereby the screen is visible exteriorly of the top but is protected from mechanical damage.

6. An amusement device comprising, an upright support adapted for mounting on a floor, the support includes a plurality of outwardly-extending integral feet formed integral with each other at a junction and a substantially vertical column secured to the junction of said feet, a housing secured to and supported by the upper portion of the support at a selected height above the floor, the housing supported at the upper end of the column, said table top having a portion extending outwardly of the housing to allow players to place their feet and knees below the table top in a seated attitude, said housing being open at its uppermost position, a table top hingedly connected to the housing to allow the top to be raised for exposing the interior of the housing, said top having a screen aperture in its center, a cathode ray tube secured to the top and having a screen positioned adjacent to the screen aperture to allow the screen to be viewed exteriorly of the top, electronic circuitry mounted on the interior surface of the top and electrically connected to the cathode ray tube to reproduce an image of a ball moving across the screen and a plurality of paddle images for giving the appearance of a paddle striking the ball and returning it, a plurality of manual control devices mounted on the top and accessible from the exterior of the top to manipulate selected portions of the electronic circuitry to move the paddle images on the screen, said top includes a mounting plate recess adjacent to each of the manual control devices, said top having a shaft aperture extending through a portion of the top and communicating with each of said recesses, each of said control devices including a mounting plate securely mounted in its respective mounting plate recess, a U-shaped bracket secured to each of the mounting plates and positioned in its respective shaft aperture, a portion of the electronic circuitry supported on the U-shaped bracket, a knob shaft rotatably mounted in its respective mounting plate and the U-shaped bracket and extending exteriorly of said table top, each of said knot shafts connected to the respective selected portion of the electronic circuitry for controlling its respective portions of the circuitry to move a selected image on the screen, a knob mounted on each of the knob shafts exteriorly of the table, a transparent glass positioned in the screen aperture in the center of the top, said top including a decorative sheet extending over the entire surface of the top over the mounting plates and abutting the transparent glass to form a continuous surface, said transparent glass being sealingly secured at its edges to the top to seal closed the screen aperture, a coin control device mounted on the housing and electrically connected to the electronic circuitry to control the operation of electronic circuitry for the production of the images on the screen; said coin control device includes a coin receptacle within the housing, said coin receptacle has a receptacle cover mounted thereon, an arm pivotedly connected to the receptacle cover, and a coin lock releasably locking the arm to the receptacle to hold the receptacle cover onto the receptacle; a lock for releasably locking the top to the housing to control access to the interior of the housing, a speaker mounted in the housing and being electrically connected to the electronic circuitry for emitting a sound when a paddle image appears to strike the ball; and a draft assembly mounted in the housing for cooling the interior of the housing.

* * * * *